(12) United States Patent
Phillips

(10) Patent No.: US 7,600,957 B2
(45) Date of Patent: Oct. 13, 2009

(54) EXPANDABLE SEALANT FOR FASTENERS

(75) Inventor: Brian J. Phillips, Lake Orion, MI (US)

(73) Assignee: ND Industries, Inc., Clawson, MI (US)

( * ) Notice: Subject to any disclaimer, the term of this patent is extended or adjusted under 35 U.S.C. 154(b) by 0 days.

(21) Appl. No.: 11/287,821

(22) Filed: Nov. 28, 2005

(65) Prior Publication Data

US 2007/0122628 A1 May 31, 2007

(51) Int. Cl.
*F16B 1/00* (2006.01)
*C08J 9/00* (2006.01)
*C08L 63/00* (2006.01)
*B32B 27/38* (2006.01)

(52) U.S. Cl. .......................... 411/82.2; 521/50; 521/99; 521/178; 523/400

(58) Field of Classification Search .................... 521/50, 521/76, 99, 178; 523/400, 440; 525/523
See application file for complete search history.

(56) References Cited

U.S. PATENT DOCUMENTS

| | | | |
|---|---|---|---|
| 4,101,497 A | 7/1978 | Charves et al. | |
| 4,191,677 A | 3/1980 | Strand | |
| 4,420,604 A | 12/1983 | Wallace | |
| 4,536,524 A | 8/1985 | Hart et al. | |
| 4,835,819 A | 6/1989 | Duffy | |
| 4,847,133 A | 7/1989 | Foxman | |
| 4,856,954 A * | 8/1989 | Peterson | ..................... 411/427 |
| 5,000,636 A | 3/1991 | Wallace | |
| RE33,766 E | 12/1991 | Duffy et al. | |
| 5,193,958 A | 3/1993 | Day | |
| 5,221,170 A | 6/1993 | Duffy et al. | |
| 5,244,956 A | 9/1993 | Miller | |
| 5,260,100 A | 11/1993 | Day | |
| RE34,522 E | 1/1994 | Wallace | |
| 5,304,023 A | 4/1994 | Toback et al. | |
| 5,426,130 A | 6/1995 | Thurber et al. | |
| 5,636,953 A | 6/1997 | Jaeger et al. | |
| 5,679,160 A | 10/1997 | Wallace et al. | |
| 5,718,945 A | 2/1998 | Arslanouk | |
| 5,836,721 A | 11/1998 | Wallace | |
| 5,853,520 A | 12/1998 | Rich et al. | |
| 5,918,727 A | 7/1999 | Wallace et al. | |
| 6,004,627 A | 12/1999 | Duffy et al. | |
| 6,270,838 B1 | 8/2001 | Wallace et al. | |
| 6,279,652 B1 * | 8/2001 | Chatterji et al. | ............. 166/194 |
| 6,298,633 B1 | 10/2001 | McCorkle et al. | |
| 6,479,560 B2 * | 11/2002 | Freitag et al. | ................ 521/130 |
| 6,489,023 B1 | 12/2002 | Shinozaki et al. | |
| 6,582,824 B1 | 6/2003 | Weigl et al. | |
| 6,666,870 B2 | 12/2003 | Dixon et al. | |
| 6,793,813 B1 | 9/2004 | Ethridge et al. | |
| 6,830,799 B1 | 12/2004 | Duffin et al. | |
| 6,896,462 B2 | 5/2005 | Stevenson et al. | |
| 6,899,502 B2 | 5/2005 | Strunk | |

* cited by examiner

*Primary Examiner*—Michael J Feely
(74) *Attorney, Agent, or Firm*—Winston & Strawn LLP; Richard P. Gilly

(57) ABSTRACT

An expandable sealant is provided for a fastener including a threaded defining surface. The fastener includes the expandable sealant as a coating adhered to at least a portion of the thread-defining surface to lock the fastener in place and to expand to fill space between the thread-defining surface of the fastener and an aperture through which the fastener is passed to seal the aperture to prevent fluid and gases from passing therethrough.

17 Claims, No Drawings

EXPANDABLE SEALANT FOR FASTENERS

BACKGOUND OF THE INVENTION

1. Field of the Invention

The present invention relates generally to fasteners and, more particularly, to an expandable sealant to lock a fastener in place and seal any space between the fastener and an aperture through which the fastener is passed.

2. Description of the Related Art

It is known to provide a fastener to fasten at least two parts together. The fastener may be of a self-locking type. For example, the self-locking fasteners may be of a type in which the self-locking characteristic is derived from a coating such as a patch material adhered to all or a portion of a thread defining surface of the fasteners. These self-locking fasteners have proven to be very popular for a wide variety of applications in order to prevent loosening of the fastener due to vibration and the like in various applications.

In some applications, the fastener passes through an aperture in at least one of the parts. When the fastener passes through the aperture, there may be a space formed in the aperture between the fastener and the part. As a result, this space will normally allow fluids and gases to pass through the aperture through which the fastener is placed.

Therefore, it is desirable to provide a coating for a fastener that locks the fastener in place and prevents fluids and gases from passing through the aperture through which the fastener is placed. It is also desirable to provide a coating for a fastener that expands to prevent fluids and gases from passing through an aperture and past the fastener. It is further desirable to provide a coating for a fastener that seals a space between the fastener and the part through which the fastener is placed. Thus, there is a need in the art to provide a coating for a fastener that meets these desires.

SUMMARY OF THE INVENTION

It is, therefore, one object of the present invention to provide an expandable sealant for a fastener.

It is another object of the present invention to provide a fastener having an expandable sealant adhered to all or a portion of a thread-defining surface of the fastener.

Accordingly, the present invention is an expandable sealant for a fastener. The expandable sealant includes from about thirty-five percent by weight (35 wt %) to about forty-five percent by weight (45 wt %) of an epoxy based material; from about thirty-five percent by weight (35 wt %) to about fifty percent by weight (50 wt %) of an organic solvent; from about seven percent by weight (7 wt %) to about fourteen percent by weight (14 wt %) of a curing agent; from about two percent by weight (2 wt %) to about five percent by weight (5 wt %) of a binder; and from about one (1 wt %) to about six percent by weight (6 wt %) of a blowing agent.

In addition, the present invention is a fastener including a threaded defining surface. The fastener also includes an expandable sealant adhered to at least a portion of the thread defining surface to lock a fastener in place and to expand to fill space between the thread defining surface of the fastener and an aperture through which the fastener is passed to seal the aperture to prevent fluid and gases from passing therethrough.

One advantage of the present invention is that an expandable sealant is provided for a fastener. Another advantage of the present invention is that the expandable sealant has a formulation that locks a fastener in place and expands to fill gaps that would normally allow fluids and gases to pass through which an aperture and past the fastener. Yet another advantage of the present invention is that the expandable sealant is applied to at least a portion of the threads of the fastener to form a self-locking fastener. Yet another advantage of the present invention is that upon application, the expandable sealant is dry to the touch, facilitating easy handling of such treated fasteners. Yet another advantage is that no additional energy need be added to the expandable sealant of the present invention to initiate epoxy cure or by way of a blowing agent to expand the epoxy material. Rather, epoxy cure and expansion of the sealant are initiated by the mechanical energy releases in the action of applying the treated fastener to a treated threaded surface, such as a nut and bolt assembly, to form the expandable sealant of the present invention.

Other objects, features, and advantages of the present invention will be readily appreciated, as the same becomes better understood, after reading the subsequent description.

DESCRIPTION OF THE PREFERRED EMBODIMENT(S)

The present invention is a composition that forms an expandable sealant with good cured mechanical properties. The composition includes an epoxy based material such as polyepoxides having more than one epoxy group per molecule, with the epoxy group typically using a terminal 1, 2 epoxy group. Although both liquid and solid polyepoxides can be used, it is preferred that polyepoxides in the solid form be utilized. These polyepoxides are typically available as micro sphere particles having an average diameter from about 100 microns to about 500 microns, and are available from suppliers such as ND Industries, Inc. of Troy, Mich.

Resins including the epoxy micro spheres are dissolved in a solvent. Generally, common organic solvents such as an aromatic organic solvent are preferred. Among these, it is possible to use benzene, xylene, toluene, styrene, and mixtures thereof. It is most preferred to use toluene as the solvent.

A solvent is present in an amount of about 35 to about 50% by weight of the composition, and most preferably is toluene, present in the amount of about 40.41% by weight of the composition.

The curing agent may be selected from the group consisting of aliphatic, cycloaliphatic, aliphatic modified amines, and mixtures thereof. A curing agent such as AMICURE® PACM available from Air Products of Allentown, Pa., is preferred as a curing agent for the epoxy-based resins previously described. These compositions are methylene bridged poly (cyclohexyl-aromatic)amines. Other polyamine curing agents may be used in combination, which include aromatic poly amines such as diethyltoluenediamine, and methylenedianaline, aliphatic amines such as di(4-aminocyclohexyl) methane (AMICURE PACM). It is preferred to use di(4-aminocyclohexyl)methane as the polyamine curing agent. Other polyamine curing agents include isophoronediamine, 1-3 xylylenedamine, and polyalkylene polyamines such as diethyelenetriamine and triethylenetriamine and the mixed methylene bridged poly(cyclohexylaromatic)amine, 4(4'-aminobenzyl)cyclohexylamine (ABCHA). When a mixture of polyamines is used as a curative, the range would be from five weight percent (5 wt. %) to seventy weight percent (70 wt. %) of the curative. Most preferably, the curing agent is AMICURE® PACM present in an amount of about 10.8 wt. % of the composition.

A binder may be selected from the group consisting of polyvinyl alcohol, polyvinyl butyral, polyvinyl acetate, mixtures thereof, or other vinyl acetal is useful in the present invention. The binder may be in the present range from about 2 wt. % to about 5 wt. % of the composition and most preferably the binder is a polyvinyl butyral known as BUTVAR® B-79 available from Solutia, Inc of St. Louis, Mo. The BUTVAR B-79 present in the amount of about 3.5 wt. % of the composition.

Blowing agent may be selected from the group consisting of methyl hydrogen silicone, methyl hydrogen polysiloxane, and mixtures thereof. A blowing agent such as LIPO MH-30 available from the Lipo Company, Inc., of Vandalia, Ohio, is present to act as a foaming agent under the proper conditions. The blowing agent is present in the amount of from about 1 wt. % to 6 wt. % of the composition and most preferably in the range of about 4 wt. % of the composition.

A pigment can be added to the composition to suit the end user. Pigment may be present in any effective amount up tot about 1 wt. %, and most preferably in the amount of about 0.09 wt. % of the composition. A suitable pigment is Pylam Liquid oil green.

The compositions described above can be pre-applied as a coating to the threads of a fastener to provide for superior locking properties of the fastener once it is installed into the aperture. In addition, the compositions described herein exhibit good expanding properties at ambient temperatures such that the composition expands at an ambient temperature until it is cured thereby acting as a sealant to seal spaces between the threads of the fastener and the aperture to which it is passed through.

The compositions of the present invention are useful in many applications including those that require stringent locking and sealing properties. It is contemplated that the compositions described herein are useful in automotive aircraft and military applications.

The following examples describe the present invention in more detail. The parts and percentages unless otherwise indicated are parts and percentages by weight of the composition.

EXAMPLES

The composition of the present invention was tested for its sealing and adhesion capabilities. The composition was comprised as follows:

| | |
|---|---|
| Toluene | 40.41% by weight |
| BUTVAR B79 | 3.5% by weight |
| AMICURE PACM | 10.8% by weight |
| ND Epoxy Microsheres | 41.2% by weight |
| LIPO MH-30 Caps | 4.0% by weight |
| Pylam Liquid oil green | 0.09% by weight |

Each fastener treated with the above composition was tested for its sealing and adhesion capabilities. In each example, the fasteners were each treated with a composition as indicated and subjected to testing using the following equipment:

Materials and Test Instrumentation:
Pressure fixture LE 200;
Torque wrenches LE 040, 456, and 208;
Lab Ovens LE 007 and 456;
Cooling station LE 139;
0.75" aluminum and 0.50" steel test blocks;
M1O×1.5, zinc, zinc di-chromate, dry zinc phosphate and oil and dry phosphate bolts 0.25" and 0.375" zinc and zinc di-chromate tapered pipe plugs supplied by GM NB 115-PO20; and Expandable Sealant.

The fasteners so treated were tested to prove that the product submitted does:
Lock the fastener when mated with metal part;
Expand to fill any gaps to seal from seepage;
Sustain adhesive integrity in common automotive fluids;
Retain a given fluid or air when under high pressure;

M10×1.5 bolts were used for testing sealing capabilities. Three plating types of M10 were used: zinc, zinc dichromate, and dry zinc phosphate. The basic setup was to test M10 fasteners in over-bored holes or apertures that were made in an aluminum fixture. The maximum counter bore tolerance for aluminum was used which can be viewed in Table 1.

TABLE 1

Specification used to over tap the counter bores.
ALUMINUM: SPECIFICATIONS FOR TAPPED HOLES

| | | | | PRINT DIMENSIONS | | | | Tap Drill Dia Cut Thread (Ref.) | | Tap Drill Dia Roll | Thread | Chamfer Depth to | |
|---|---|---|---|---|---|---|---|---|---|---|---|---|---|
| Thread | Basic | Thrd | Thrd Tol | C'Bore | C'Bore | Full Thread Depth | Tap Drill | Minor Diameter | | Form (ref) | Engage | 60% thrd | MAT |
| Size | Dia | Pitch | Class | Depth +/−0.5 | Dia. +/−0.25 | (Min.) | Depth** +/−0.5 | Min | Max | 75% thd. | (Min.) | (max) | Point |
| Variable -> | t | P | | CB | Dc | Lt | Ld | | | Dl | Te | Lc | Q |
| Formula -> | N/A | N/A | N/A | | t + 1 | Calc. 2 | Lt + 4p + 0.5 | N/A | N/A | Calc. 1 | 2 t | Calc 3 | |
| | | | | | Standard Counterbore (Use when part thickness is at least 1 t) | | | | | | | | |
| M10 × 1.5 | 1 | 10 | 1.50 | | 6H 1 0.50 | 11.000 | 27.0 | 33.50 | 8.376 | 8.676 1 | 9.24 | *l* 20.0 *l* | 2.1 | 1 7.5 |

All dimensions in mm.
N/A: Not Applicable

Each fastener was flow-coated with the expandable sealant, leaving the first 2-3 threads open for proper engagement. The fasteners were dried in a 135° C. oven for 4-5 minutes, allowed to cool to room temperature, and mated with the aluminum plate. The viscosity of the mixture for each flow coating was 15 seconds on Zahn cup #3. The cure time for each fixture was 24 hours prior to soaking. All fixtures were then soaked in various automotive fluids for 30 days at their respecting elevated temperatures, allowed to return to room temperature, tested for the 60 second pressure test at 793 kPa (115 psi), and checked for the breakaway and prevailing off torques. All breakaway, prevailing on and prevailing off torques were performed with respect to ASTM D5649, "Standard Test Method for Torque Strength of Adhesives Used on Threaded Fasteners". The automotive fluids and the elevated temperatures are shown below:

| Automotive fluid | ° C. |
|---|---|
| DOT 3 Brake fluid | 150 |
| 87 oct. Gas | Room Temp |
| 50/50 Glycol Water Mixture | 125 |
| Transmission Fluid | 150 |
| Engine Oil 5w-30 | 150 |

In order to test for adhesion, coated M10×1.5 fasteners in the form of a bolt were mated with a zinc-dry phosphate nut under ambient conditions. The types of plating tested were zinc, zinc-dichromate, phos and oil (GM4435 oil), and dry zinc phosphate. All bolts were clean from any debris or lubricants with the exception of the phos and oil. The bolt and nut combination was allowed to cure for 24 hours and then breakaway and prevailing off torques were recorded.

Cyclic testing consisted of 15 coated, dry phos bolts mated with the over sized, M10, aluminum plate fixture. The test fixtures were allowed to sit at ambient temperature for 72 hours to ensure that there was a through and complete cure. The fixture was placed in a 150° C. oven for 1 hour, placed directly into a −30° C. cooling station for 2 hours and finally taken out and allowed to rest at room temperature for 1 hour. The fixture was then pressurized to 793 kPa (115 psi) for 60 seconds to check for leaks, de-pressurized, and torque tests were performed; breakaway and prevailing off.

Fixtures were made up with a set of 15, 0.25" or 0.375", NPSF straight, counter bores in 4×6×0.50" steel plate. Mated with the holes were the respecting coated, tapered, drain plugs. The 0.25" plug was seated to 19 N-m and the 0.375" was seated to 31 N-m. The fixtures were tested for leaks at 793 kPa (115 psi) and break loose/prevailing off torques after a 24 hour period.

Results:

Every plate in every test passed the 60 second pressure test. The 793 kPa or 115 psi was made a standard based on the compressor consistency of output. Listed below are the results for each test and are labeled respectfully.

Expandable sealant data

All Bolts are M10×1.5 30 Day Duration

All fixtures tested to 793 kPa for more than 60 seconds

All fixtures Aluminum 19 mm thick

TABLE 2

Breakaway/prevailing off torques (N-m) in automotive fluids.

| Zn | | Zinc Dichromate | | Dry Phos | |
|---|---|---|---|---|---|
| Break N-m | Prevail N-m | Break N-m | Prevail N-m | Break N-m | Prevail N-m |
| Standard RT | | | | I Pressure Test: Pass | |
| 47.45 | 48.02 | 28.25 | 18.08 | 53.10 | 55.36 |
| 44.06 | 29.37 | 28.25 | 39.54 | 42.93 | 41.80 |
| 39.54 | 19.77 | 33.89 | 29.37 | 50.84 | 48.58 |
| 45.19 | 31.07 | 37.28 | 28.25 | 49.15 | 45.19 |
| 50.84 | 46.32 | 37.28 | 25.42 | 54.23 | 56.49 |
| 45.42 | 34.91 | 32.99 | 28.13 | 50.05 | 49.49 |
| 39.54 | 19.77 | 28.25 | 18.08 | 42.93 | 41.80 |
| 50.84 | 48.02 | 37.28 | 39.54 | 54.23 | 56.49 |
| 87 oct. Gas RT | | | | I Pressure Test: Pass | |
| 37.28 | 27.12 | 28.25 | 28.25 | 39.54 | 28.25 |
| 45.19 | 33.89 | 25.42 | 22.60 | 39.54 | 42.37 |
| 36.72 | 30.50 | 28.25 | 27.12 | 45.19 | 44.06 |
| 42.37 | 42.37 | 33.89 | 28.25 | 39.54 | 39.54 |
| 39.54 | 35.02 | 38.41 | 25.42 | 39.54 | 42.37 |
| 40.22 | 33.78 | 30.84 | 26.32 | 40.67 | 39.32 |
| 37.28 | 27.12 | 25.42 | 22.6 | 45.19 | 28.25 |
| 45.19 | 43.37 | 38.41 | 28.25 | 39.54 | 44.06 |
| 50/50 125 C. oven | | | | I Pressure Test: Pass | |
| 48.02 | 47.45 | 39.54 | 42.37 | 56.49 | 59.31 |
| 48.58 | 67.79 | 36.72 | 48.02 | 45.19 | 57.62 |
| 49.71 | 55.36 | 39.54 | 33.89 | 21.47 | 53.67 |
| 50.84 | 47.45 | 36.72 | 33.89 | 53.67 | 64.96 |
| 42.37 | 46.32 | 36.72 | 39.54 | 42.37 | 59.31 |
| 47.90 | 52.87 | 37.85 | 39.54 | 43.84 | 58.98 |
| 42.37 | 46.32 | 36.72 | 33.89 | 21.47 | 53.67 |
| 50.84 | 67.79 | 39.54 | 48.02 | 56.49 | 64.96 |
| Trans. Fluid 150 C. oven | | | | I Pressure Test: Pass | |
| 48.02 | 23.73 | 28.25 | 36.72 | 62.14 | 39.54 |
| 50.84 | 33.89 | 31.63 | 33.89 | 67.79 | 50.84 |
| 39.54 | 28.25 | 36.72 | 36.72 | 55.36 | 41.80 |
| 53.67 | 39.54 | 28.25 | 36.72 | 62.14 | 31.63 |
| 54.23 | 33.89 | 33.89 | 39.54 | 67.79 | 31.07 |
| 49.26 | 31.86 | 31.75 | 36.72 | 63.04 | 38.98 |
| 39.54 | 23.73 | 28.25 | 33.89 | 55.36 | 31.07 |
| 54.23 | 39.54 | 36.72 | 39.54 | 67.79 | 50.84 |
| Engine oil 150 C. oven | | | | I Pressure Test: Pass | |
| 63.27 | 48.02 | 33.89 | 36.15 | 67.79 | 36.15 |
| 50.84 | 45.19 | 36.72 | 45.19 | 64.40 | 45.19 |
| 53.67 | 36.72 | 45.19 | 42.93 | 70.05 | 42.93 |
| 59.31 | 42.93 | 35.02 | 53.67 | 67.79 | 53.67 |
| 56.49 | 48.02 | 35.02 | 39.54 | 67.79 | 39.54 |
| 56.72 | 44.18 | 37.17 | 43.50 | 67.56 | 43.50 |
| 50.84 | 36.72 | 33.89 | 36.15 | 64.40 | 36.15 |
| 63.27 | 48.02 | 45.19 | 53.67 | 70.05 | 53.67 |

TABLE 3

Pipe plug pressure and adhesion test.

| Pipe Plug | |
|---|---|
| Break N-m | Prevail N-m |
| ⅜" Zinc Dichromate 31 N-m Seating Torque Pressure test: PASS | |
| 62.14 | 45.19 |
| 50.84 | 39.54 |
| 50.84 | 33.89 |
| 50.84 | 39.54 |
| 53.67 | 45.19 |

TABLE 3-continued

Pipe plug pressure and adhesion test.

Pipe Plug

| Break N-m | Prevail N-m | |
|---|---|---|
| 39.54 | 33.89 | |
| 48.02 | 33.89 | |
| 45.19 | 33.89 | |
| 53.67 | 39.54 | |
| 45.19 | 33.89 | |
| 59.31 | 45.19 | |
| 48.02 | 33.89 | |
| 53.67 | 39.54 | |
| 56.49 | 45.19 | |
| 62.14 | 45.19 | |
| 51.97 | 39.17 | Average |
| 39.54 | 33.89 | Min. |
| 62.14 | 45.19 | Max. |

¼" Zinc
19 N-m Seating Torque
Pressure test: PASS

| Break N-m | Prevail N-m | |
|---|---|---|
| 50.84 | 33.89 | |
| 33.89 | 22.60 | |
| 33.89 | 22.60 | |
| 53.67 | 22.60 | |
| 53.67 | 31.07 | |
| 36.72 | 28.25 | |
| 39.54 | 28.25 | |
| 39.54 | 25.42 | |
| 45.19 | 22.60 | |
| 39.54 | 25.42 | |
| 39.54 | 33.89 | |
| 36.72 | 28.25 | |
| 50.84 | 33.89 | |
| 39.54 | 22.60 | |
| 45.19 | 28.25 | |
| 42.56 | 27.30 | Average |
| 33.89 | 22.60 | Min. |
| 53.67 | 33.89 | Max. |

TABLE 4

M10 × 1.5 bolts breakaway/prevailing off torques when combined with M10 × 1.5 Dry Phos nut.

| Phos and Oil M10 | | Zinc | | Zinc Dichromate | | Dry Phosphate | |
|---|---|---|---|---|---|---|---|
| Break N-m | Prevail N-m | Break N-m | Prevail N-m | Break N-m | Prevail N-m | Break N-m | Prevail N-m |
| 35.02 | 20.34 | 23.73 | 5.65 | 22.60 | 4.52 | 36.72 | 19.77 |
| 33.89 | 20.34 | 31.63 | 7.91 | 27.12 | 5.65 | 36.72 | 19.77 |
| 33.89 | 19.77 | 29.37 | 7.91 | 15.82 | 3.39 | 36.72 | 22.596 |
| 36.15 | 28.25 | 31.63 | 6.78 | 28.25 | 5.65 | 36.72 | 11.298 |
| 33.89 | 22.60 | 16.95 | 2.26 | 30.50 | 6.78 | 36.72 | 22.596 |
| 34.57 | 22.26 | 26.66 | 6.10 | 24.86 | 5.20 | 36.72 | 19.21 |
| 33.89 | 19.77 | 16.95 | 2.26 | 15.82 | 3.39 | 36.72 | 11.30 |
| 36.15 | 28.25 | 31.63 | 7.91 | 30.50 | 6.78 | 36.72 | 22.60 |

TABLE 5

Temperature cycle test results on Dry Phos M10 × 1.5 bolts.

Cycle Test
M10 × 1.5 dry Phos. 72 hour cure
Pressure Test: Pass

| Break N-m | Prevail N-m | |
|---|---|---|
| 56.49 | 45.19 | |
| 56.49 | 33.89 | |
| 56.49 | 39.54 | |
| 62.14 | 33.89 | |
| 59.31 | 36.72 | |
| 56.49 | 31.07 | |
| 56.49 | 33.89 | |
| 59.31 | 28.25 | |
| 56.49 | 36.72 | |
| 62.14 | 36.72 | |
| 50.84 | 31.07 | |
| 53.67 | 31.07 | |
| 48.02 | 28.25 | |
| 45.19 | 28.25 | |
| 50.84 | 36.72 | |
| 55.36 | 34.08 | Average |
| 45.19 | 28.25 | Min. |
| 62.14 | 45.19 | Max. |

Conclusion:

The objective was to test the expandable sealant such that it locked a fastener in place and sealed under high pressure conditions. The composition was tested under the various conditions: automotive fluids, temperature changes, and elevated pressure. From the results of testing, no leaks were observed and all fasteners/plugs locked in place after a 24 hour cure schedule. This composition can be used as a sealing and locking adhesive for various types of fasteners.

The present invention has been described in an illustrative manner. It is to be understood that the terminology, which has been used, is intended to be in the nature of words of description rather than of limitation and the examples are intended to illustrate and not limit the scope of the present invention.

Many modifications and variations of the present invention are possible in light of the above teachings. Therefore, within the scope of the appended claims, the present invention may be practiced other than as specifically described.

What is claimed is:

1. An expandable sealant for a fastener comprising:
   a) from about 35 to about 45 percent by weight of an epoxy based material of a polyepoxide type;
   b) from about 35 to about 50 percent by weight of an organic solvent;
   c) from about 7 to about 14 percent by weight of a curing agent;
   d) from about 2 to about 5 percent by weight of a binder; and
   e) from about 1 to about 6 percent by weight of a blowing agent, wherein the solvent is evaporated and the binder holds the remaining components to the fastener such that the expandable sealant is activated based upon engagement between the fastener and a mating part.

2. An expandable sealant as set forth in claim 1, wherein said solvent is an aromatic solvent selected from at least one of benzene, xylene, toluene, styrene, and mixtures thereof.

3. An expandable sealant as set forth in claim 2, wherein said solvent is toluene.

4. An expandable sealant as set forth in claim 1, wherein said curing agent is selected from at least one of aliphatic, cycloaliphatic, Aliphatic modified amines, and mixtures thereof.

5. An expandable sealant as set forth in claim 4, wherein said curing agent is di(4-aminocyclohexyl)methane.

6. An expandable sealant as set forth in claim 1, wherein said binder is a vinyl acetal selected from at least one of poly vinyl butyral, poly vinyl acetal, and mixtures thereof.

7. An expandable sealant as set forth in claim 1, further including from up to about 1 percent by weight of a pigment.

8. An expandable sealant for a fastener comprising:
from about 35 to about 45 percent by weight of an epoxy based material;
from about 35 to about 50 percent by weight of an organic solvent;
from about 7 to about 14 percent by weight of a curing agent;
from about 2 to about 5 percent by weight of a binder;
from about 1 to about 6 percent by weight of a blowing agent; and
wherein said epoxy based material is an epoxy microsphere material with an average sphere size is in the range of from about 100 microns to about 500 microns.

9. An expandable sealant for a fastener comprising:
from about 35 to about 45 percent by weight of an epoxy based material of polyepoxide type;
from about 35 to about 50 percent by weight of an organic solvent;
from about 7 to about 14 percent by weight of a curing agent;
from about 2 to about 5 percent by weight of a binder;
from about 1 to about 6 percent by weight of a blowing agent; and
wherein said blowing agent is selected from at least one of methyl hydrogen silicone fluid, methyl hydrogen polysiloxane, and mixtures thereof.

10. An expandable sealant as set forth in claim 9, wherein said blowing agent is methyl hydrogen polysiloxane.

11. An expandable sealant for a fastener comprising:
an epoxy based material of a polyepoxide type formed as microsphere particles, an organic aromatic solvent, a curing agent, a binder, and a blowing agent, wherein the solvent is evaporated and the binder holds the remaining components to the fastener such that the expandable sealant is activated based upon engagement between the fastener and a mating part.

12. A fastener comprising:
a threaded defining surface; and
an expandable sealant pre-applied as a coating to at least a portion of the thread defining surface and is dry to the touch until activated, wherein the expandable sealant is activated based upon engagement between the thread defining surface and a mating part to lock the fastener in place and to expand to fill space between the thread defining surface of the fastener and an aperture through which the fastener is passed to seal the aperture through which the fastener is passed to prevent fluid and gases from passing therethrough;
wherein said expandable sealant comprises:
a) from about 35 to 45 percent by weight of an epoxy based material;
b) from about 35 to about 50 percent by weight of an organic solvent;
c) from about 7 to about 14 percent by weight of an epoxy curing agent;
d) from about 2 to about 5 percent by weight of a binder;
e) from about 1 to about 6 percent by weight of a blowing agent;
f) up to about 1 percent by weight of a pigment.

13. A fastener as set forth in claim 12, wherein said organic solvent is an aromatic solvent selected from the group consisting of benzene, xylene, toluene, styrene, and mixtures thereof.

14. A fastener as set forth in claim 13, wherein said solvent is toluene.

15. A fastener as set forth in claim 12, wherein said curing agent is selected from the group consisting of aliphatic, cycloaliphatic, aliphatic modified amines, and mixtures thereof.

16. A fastener as set forth in claim 15, wherein said curing agent is di(4-aminocyclohexyl)methane.

17. A fastener as set forth in claim 12, wherein said binder is selected from the group consisting of polyvinyl butyral, polyvinyl acetate, polyvinyl alcohol, and mixtures thereof.

* * * * *